United States Patent

Johnston et al.

[11] Patent Number: 6,106,078
[45] Date of Patent: Aug. 22, 2000

[54] PRESSURE AUGMENTATION FOR BRAKE APPLY SYSTEM

[75] Inventors: Gary Lee Johnston, Pleasant Hill; Michael Leslie Oliver, Xenia; William Charles Kruckemeyer, Beavercreek; John Benjamin Hageman, Vandalia; Ernst Severin Baumgartner, Dayton; Donald Edward Schenk, Vandalia, all of Ohio

[73] Assignee: General Motors Corporation, Detroit, Mich.

[21] Appl. No.: 09/105,973

[22] Filed: Jun. 26, 1998

[51] Int. Cl.[7] .................................................. B60T 13/74
[52] U.S. Cl. ............................................. 303/2; 303/115.1
[58] Field of Search ..................................... 188/195, 361, 188/106 F; 280/124.157, 124.158, 124.159, 124.16, 124.161; 417/233; 303/3, 115.1, 115.4, 2, 114.1, 22.1, 22.5, 22.8

[56] References Cited

U.S. PATENT DOCUMENTS

| | | | |
|---|---|---|---|
| 1,332,428 | 3/1920 | Cooper | 188/361 |
| 1,862,195 | 6/1932 | Newton | 417/233 |
| 3,475,059 | 10/1969 | Klein | 303/22.5 |
| 3,666,038 | 5/1972 | Hudspeth et al. | 180/66 B |
| 4,588,205 | 5/1986 | Gaiser | 303/115.1 |
| 4,743,073 | 5/1988 | Gruenberg | 303/114.1 |
| 5,246,283 | 9/1993 | Shaw et al. | 303/115.2 |
| 5,337,560 | 8/1994 | Abdelmalek | 60/370 |

*Primary Examiner*—Robert J. Oberleitner
*Assistant Examiner*—Thomas J. Williams
*Attorney, Agent, or Firm*—Robert M. Sigler

[57] ABSTRACT

A brake apply system includes a pressure charging module having a bore carrying a pumping piston that has a base piston surface and an augmentation piston surface. The pressure charging piston separates the bore into an input chamber adjacent the base piston surface and an output chamber adjacent the augmentation piston surface. A suspension damper is hydraulically connected to the input chamber of the pressure charging module, preferably through a continuously open fluid communication circuit. A wheel brake is hydraulically connected to the accumulator output chamber through a selectively open fluid communication circuit. An accumulator is interconnected in the selectively open fluid communication circuit and maintains a pressure charge that is generated by movement of the pumping piston as effected by operation of the damper and that is delivered to the wheel brake through the selectively open fluid communication circuit Through this mechanism the initial pressurization rate of the brake apply system is increased.

10 Claims, 5 Drawing Sheets ns of the present invention will now be described by way of

PRESSURE AUGMENTATION FOR BRAKE APPLY SYSTEM

TECHNICAL FIELD

The present invention relates to a brake apply system with pressure augmentation and more particularly, to a vehicle brake apply system with a module that effects hydraulic pressure augmentation under certain brake application conditions, and where the augmentation pressure is generated by the vehicle's suspension motion.

BACKGROUND OF THE INVENTION

A typical vehicle braking system includes a master cylinder with a power booster that intensifies a manual input force and applies it to the master cylinder to effect pressurization of an associated braking system. Within the master cylinder selective movement of primary and secondary pistons develops elevated fluid pressure which is transmitted to the braking system. During base brake operation, the primary and secondary pistons generate operating fluid pressure which is used to actuate brake calipers or wheel cylinders at each vehicle wheel brake.

Electro-hydraulic brake apply systems are also known wherein the pressure applied to a vehicle's wheel brakes is controlled by a electronic unit that evaluates several parameters and delivers a control signal to a hydraulic modulator that sets the wheel brake pressure. A key parameter used to determine the appropriate braking pressure at the wheel brake is the driver's command, delivered as an input on the brake pedal. Generally, a pressure sensor or brake pedal force sensor monitors apply action providing feedback to the control system for use in setting the braking pressure.

A typical hydraulic modulator includes a pressure generation mechanism and a means of controlling delivery of the generated pressure to the wheel brakes. This may take the form of a pump and proportional hydraulic valve, a pump with a pair of two way valves or a movable piston variable pressure chamber device. The number and arrangement of these elements included in a braking system is determined by the system layout and selected control scheme.

An automotive braking system may operate without a booster under electrical or electro-hydraulic control in the traditional base brake mode wherein manual actuation of the master cylinder effects a desired application of the wheel brakes with assistance from a remote pressure modulator. In addition to the base brake mode of operation, braking systems are often capable of controlling vehicle deceleration through anti-lock operation, controlling vehicle acceleration through traction control operation, and improving lateral and longitudinal vehicle stability through stability enhancement systems that provide a level of dynamic handling augmentation. During operation of a braking system in a brake-by-wire type of control, the typical master cylinder is isolated from the remainder of the braking system and power is effected through an ancillary pressure generation mechanism such as a motor driven pump or pressure chamber/piston arrangement. In order to effect a fast response time, a relatively large motor and pump combination or a large piston is typically required. Another known method of providing a fast cycle response time is to utilize a separate high pressure accumulator to store a fluid pre-charge which can be applied to the vehicle wheel brakes when required. This accumulator is typically charged by the pump. It would be preferable to use an alternative power source to generate fluid pressure to augment pump operation.

SUMMARY OF THE INVENTION

A brake apply system according to an aspect of the present invention includes a suspension damper interface that generates a stored fluid charge for braking augmentation. The brake apply system includes a pressure charging module having a bore carrying a pumping piston that has a base piston surface and an augmentation piston surface. The pressure charging piston separates the bore into an input chamber adjacent the base piston surface and an output chamber adjacent the augmentation piston surface. A suspension damper is hydraulically connected to the input chamber of the pressure charging module, preferably through a continuously open fluid communication circuit. A wheel brake is hydraulically connected to the output chamber through a selectively open fluid communication circuit. An accumulator is interconnected in the selectively open fluid communication circuit and maintains a pressure charge that is generated by movement of the pumping piston as effected by operation of the damper and that is delivered to the wheel brake through the selectively open fluid communication circuit Through this mechanism the initial pressurization rate of the brake apply system is increased. For example, greater fluid displacement is provided during the initial 100–150 psi pressure build during brake apply, which corresponds with the highest compliance portion of the pressure versus displacement performance curve of a caliper based braking system.

BRIEF DESCRIPTION OF THE DRAWINGS

The present invention will now be described by way of example with reference to the accompanying drawings in which.

DESCRIPTION OF THE PREFERRED EMBODIMENT

Figure 1:
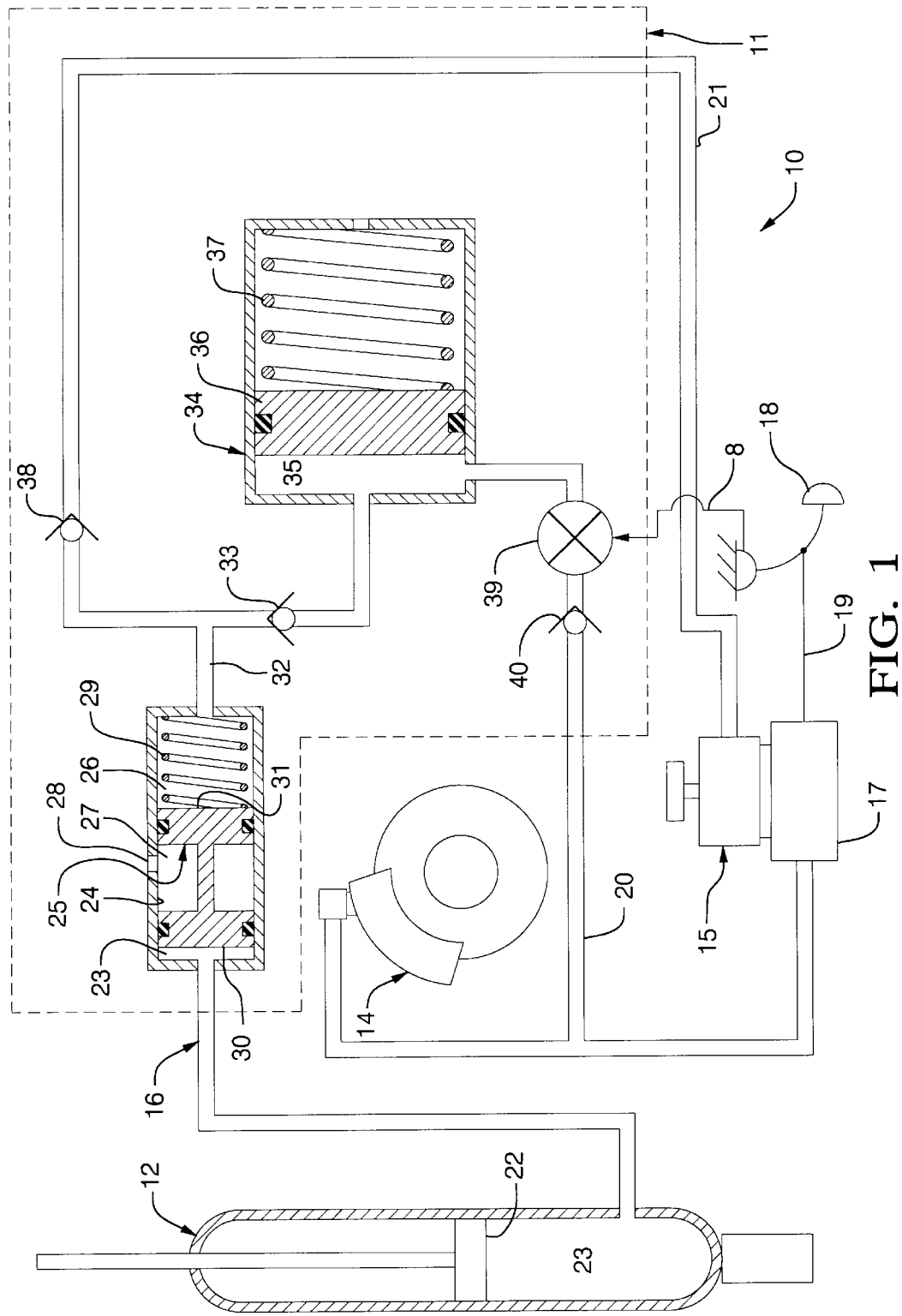
FIG. 1 is a schematic illustration of a vehicle braking system according to the present invention.

Referring to the drawings, a brake apply system is schematically illustrated in FIG. 1 and is designated generally at 10. Brake apply system 10 is of the electro-hydraulic apply type and operates without a power booster between the system's brake pedal and master cylinder assembly. This type of system is disclosed in U.S. Pat. No. 5,246,283 to Shaw, which issued Sep. 21, 1993, and is specifically incorporated herein by reference. The present invention is also applicable to independent corner braking systems that do not use a central hydraulic master cylinder. Regardless of the type of system, the primary braking function during routine braking events is supplied by a pressure generation mechanism of a braking actuator such as a master cylinder or modulator that responds in some known fashion to the application of force to the brake pedal, or in response to automated control in a preprogrammed manner. In general, the present invention captures and stores energy from the vehicle's suspension dampers and uses the energy to supplement brake actuation supplied by the pressure generation mechanism, particularly during maximum demand conditions on the braking actuator.

In general, the braking system 10 is functionally capable of applying the wheel brake 14 through the use of a pressure generation mechanism and is capable of releasing the wheel brake 14 by means of effecting fluid flow back to the reservoir 15. The master cylinder 17 is manually actuated through the brake pedal 18 and pushrod 19, and in the present embodiment does not use a conventional vacuum operated booster. The elevated line pressures preferable for vehicle braking are remotely generated in response to the application of force to the brake pedal 18. The brake apply system 10 includes a pressure charging module 11 that is hydraulically connected to a wheel brake 14 and a fluid reservoir 15 through the line 20. Fluid compensation (make-up) for the module 11 is communicated from the reservoir 15 through line 21. In addition, the module 11 interfaces with a bidirectional suspension damper 12 through the input line 16.

The pressure charging module 11 receives pressure pulses through the input line 16 during operation of the suspension damper 12. In the present embodiment, as the piston 22 of the suspension damper 12 travels in a compression direction in response to relative movement of the sprung and unsprung masses of the associated vehicle, high pressure is generated in the compression chamber 23 and in the connected input line 16. Through the input line 16 the high pressure pulse is transmitted into the pressure charging module 11 and particularly, into input chamber 23. Input chamber 23 is defined in a bore 24 that carries pumping piston 25, separating damper fluid from brake fluid in the system 10. The pumping piston 25 separates the bore 24 into the input chamber 23, an output chamber 26 and an annular chamber 27 which is defined about an undercut formed in pumping piston 25 and which is open to the atmosphere through breathing opening 28. This permits free sliding movement of the pumping piston 25 within the bore 24. A spring (mechanical or gas charge), 29 is positioned in output chamber 26 and biases the pumping piston 25 toward the input chamber 23. Pumping piston 25 has a base piston surface 30 that faces the input chamber 23 and an augmentation piston surface 31 that faces the output chamber 26. Preferably, the base piston surface is larger in area than the augmentation piston surface 31. With the spring 29 positioned in return chamber 26, when fluid pressures are nearly equal in the input chamber 23 and output chamber 26, or greater in the output chamber 26, the pumping piston 25 will be caused to slide to the left as illustrated compressing the size of input piston 23. This action is facilitated when the piston 22 of suspension damper 12 moves in an extension direction increasing the size of compression chamber 23.

The fluid pressure pulses which cause pumping piston 25 to compress the spring 29 and reduce the size of the output chamber 26 create an increased fluid pressure therein which is transmitted through the conduit 32 and the check valve 33 to accumulator 34. As the fluid is forced through the check valve 33 and into chamber 35 of accumulator 34, the piston 36 is moved against the force of spring 37 and a fluid pressure charge is created and maintained within the chamber 35. During operation, as the pumping piston 25 moves to increase the size of the output chamber 26, fluid is drawn through line 21 and the check valve 38 from the fluid reservoir 15. The same fluid is then used to charge the chamber 35 of accumulator 34. The fluid pressure stored in chamber 35 is selectively released to the wheel brake 14 through an electrically controlled valve 39 and a check valve 40. The fluid pressure travels through line 20 to the wheel brake 14 and can be used to augment braking actuation or can be used independently to actuate the wheel brake 14 in an automatic braking event. The check valve 40 prevents the transmission of braking fluid pressure toward the valve 39 during normal braking activity that occurs without augmentation from the pressure charging module 11.

The augmented operation may be responsive to movement of brake pedal 18 at a rapid apply rate, as symbolized by signal line 8 in FIG. 1. Solenoid valve 39 opens in response to a rapid apply signal on line 8 and otherwise closes.

Figure 2:
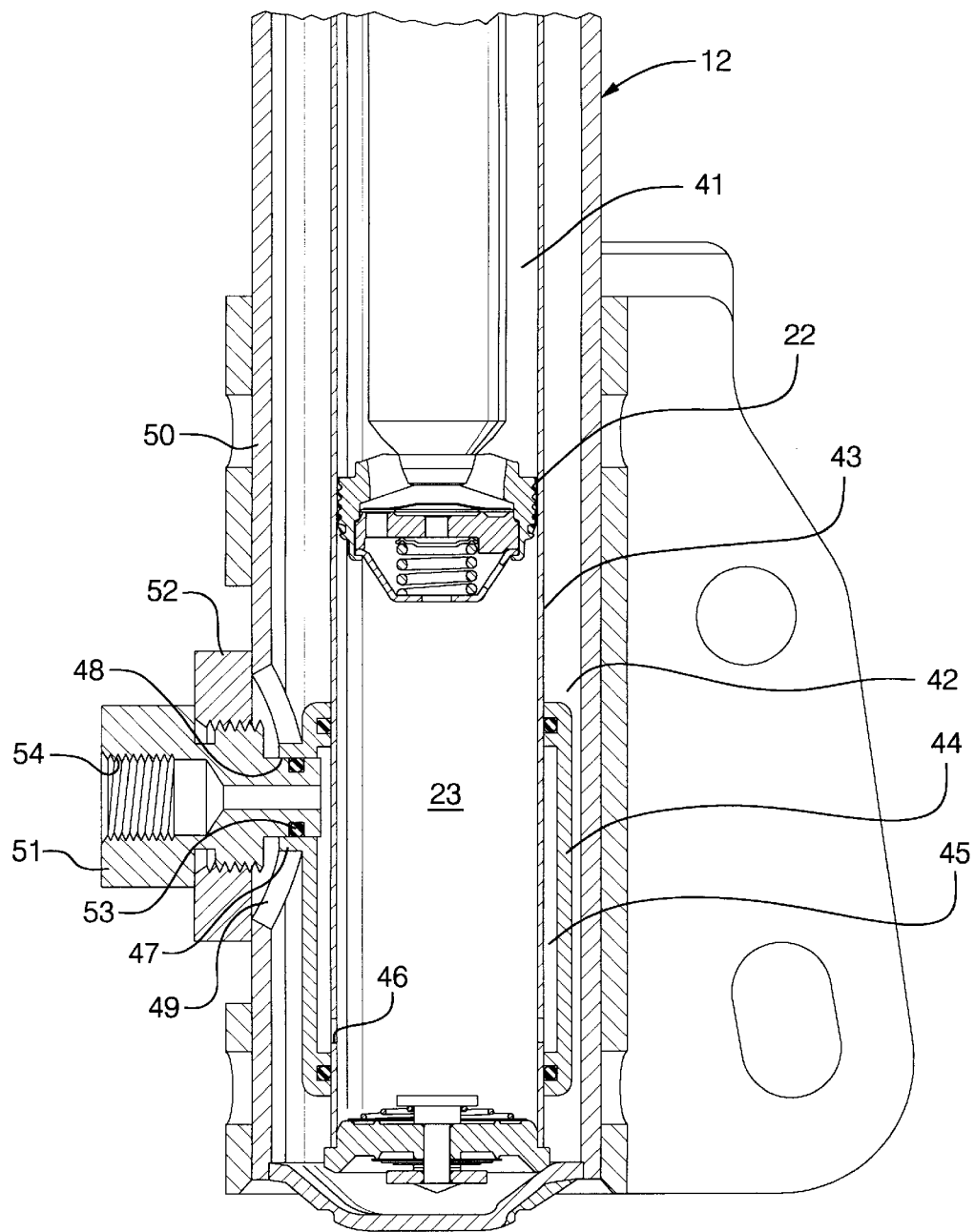
FIG. 2 is a fragmentary cross sectional detail illustration of the damper of the vehicle braking system of FIG. 1.

FIGS. 2–5 illustrate one embodiment of the mechanization of pressure charging module 11 in greater detail. Referring to FIG. 2, a mechanism for extracting fluid pressure from the suspension damper 12 is illustrated. Damper 12 is of the twin-tube variety with two working chambers including the compression chamber 23 and the extension chamber 41, which are separated by the piston 22. A reservoir 42 is also defined within the damper 12 about the cylinder tube 43 that contains the compression chamber 23 and the extension chamber 41. A cylindrical container 44 is positioned within the reservoir 42 establishing a pressure chamber 45 that is sealed off from the reservoir chamber 42 but which is open to the compression chamber 23 through openings 46 and the cylinder tube 43. Container 44 enables placement of the opening 49 at a preferable location. The container 44 includes a sleeve 47 extending from its cylindrical body that provides an opening 48 oriented perpendicular to the axis of the suspension damper 12. The sleeve 47 is positioned through an opening 49 formed within the reservoir tube 50 of the damper 12 so that a fitting 51 is positioned within the opening 48 of sleeve 47 providing access from the exterior of the damper 12 to the pressure chamber 45. The opening 49 is closed by a plate 52 that is connected to the reservoir tube 50 and by the fitting 51. The fitting 51 carries a seal 53 that engages the sleeve 47 within opening 48 maintaining fluid separation between the pressure chamber 45 and the reservoir 42. In the present embodiment the fitting 51 is provided with a threaded opening 54 for connection of a fluid line however the threaded opening 54 may be modified for use in a module without an exterior fluid line connection.

Figure 3:
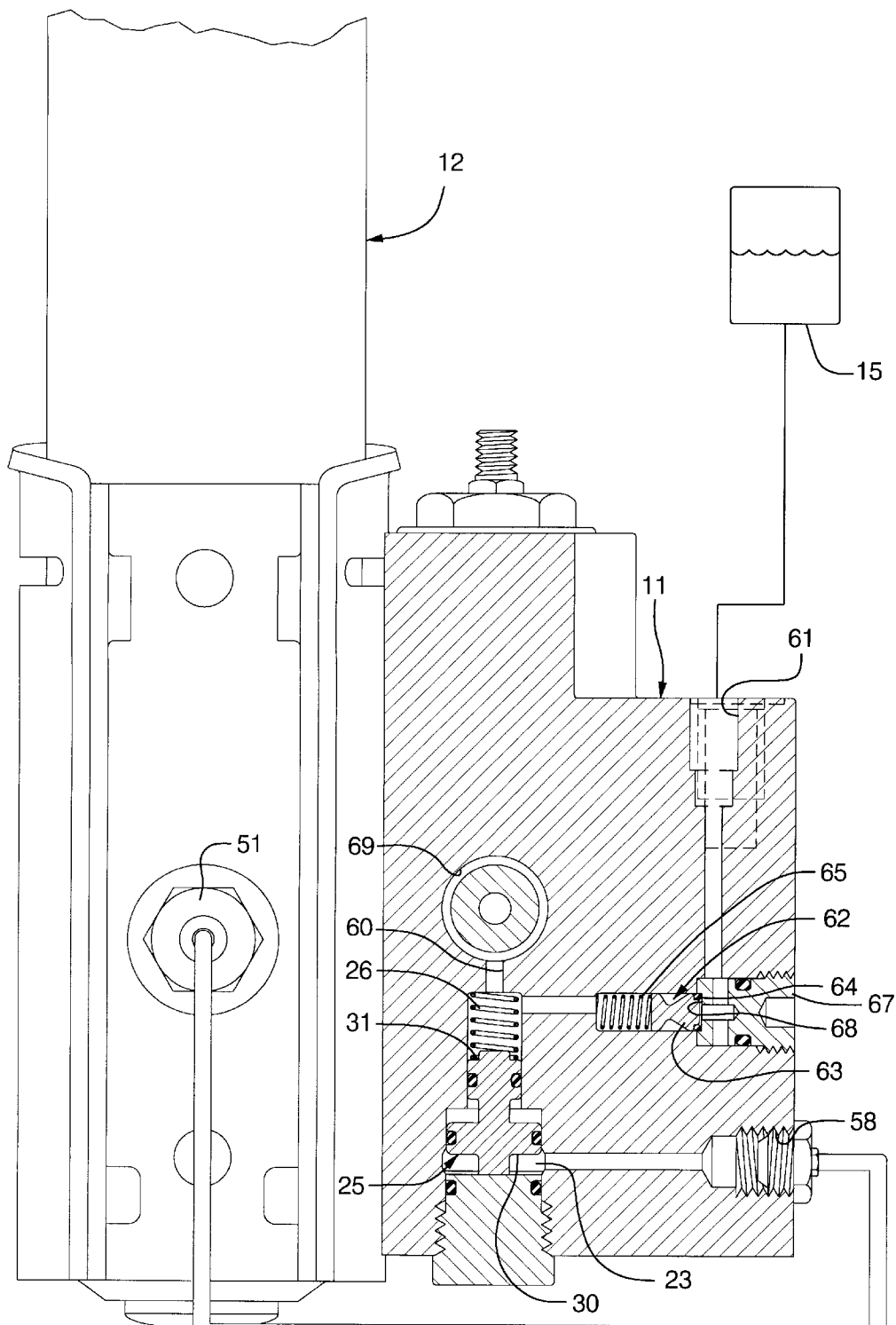
FIG. 3 is a fragmentary cross sectional detail illustration of the damper of FIG. 2 with an attached pressure charging module.

Referring to FIG. 3, the suspension damper 12 is illustrated with an attached fluid charging module 11. A fluid line 57 is connected between the fitting 51 of damper 12 and port 58 of pressure charging module 11. The container 44 permits locating the fitting 51 at a position away from the bottom end of the damper 12 while still collecting fluid pressure near the bottom of compression chamber 23. During operation of the damper 12, fluid pressure generated in the compression chamber 23 is transmitted through the line 57 and the port 58 to input chamber 23 of pressure charging module 11. The pumping piston 25 is shown with base piston surface 30 significantly larger than augmentation piston surface 31. This facilitates pumping action of the pumping piston 25. The relative size is selected for a particular application based on various factors such as charge time and damper pressures. During operation as the pumping piston 25 moves expanding the output chamber 26 makeup fluid is drawn from the reservoir 15 through the port 61. Fluid is prevented from being expelled back to the reservoir 15 from the output chamber 26 by check valve assembly 62. The check valve assembly includes a moveable body 63 that is normally closed against seal 64 under the biasing action of spring 65. The body 63 is maintained in position within the pressure control module 11 by a stop 67 that includes bisecting bores for fluid communication between the port 61 and the output chamber 26 with an annular recess 68 formed facing the moveable body 63 which holds the seal 64 providing a secure fluid tight seal with an integrity that is enhanced by increasing pressures within the output chamber 26.

Figure 4:
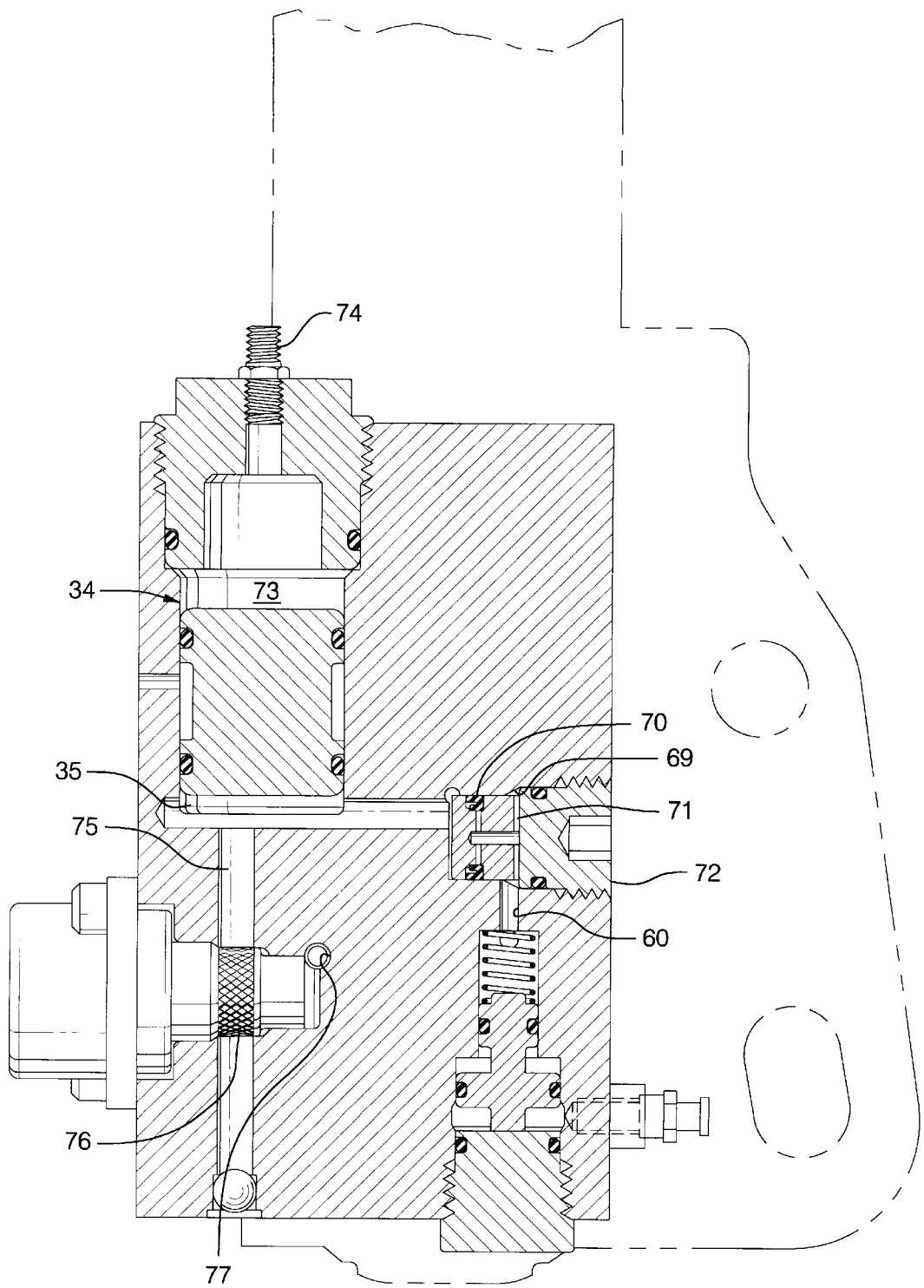
FIG. 4 is a fragmentary cross sectional detail illustration of the damper and pressure charging module of FIG. 3.

When the pumping piston 25 moves to compress the output chamber 26, under the influence of fluid pressure from the compression chamber 23, augmentation pressure is transferred through the bore 60 to the bore 69. Referring to FIG. 4, the bore 69 communicates with chamber 35 of accumulator 34. When the pressure generated in compression chamber 23 of damper 12 causes the pumping piston 25 to cycle, brake fluid flows through the bore 60 and the bore 69 to the chamber 35 past the one-way check valve seal 70. The seal 70 allows fluid flow through the bore 69 to the chamber 35 but not back toward the pumping piston 25. The check valve seal 70 is carried in a groove of annular carrier 71 which is maintained in position within the bore 69 by a plug 72. The annular carrier 71 includes a pair of bisecting bores that register with the groove that carries check valve seal 70, allowing fluid pressure at the inner diameter of the seal 70 to help in seating the check valve seal and preventing backflow. The accumulator 34 carries a gas charge within chamber 73 that is introduced through valve 74 to maintain a selected pressure range within the fluid chamber 35. From the chamber 35 fluid is available through bore 75 to the control solenoid valve 76. The solenoid valve 76 is normally closed preventing the transmission of fluid to the bore 77.

Figure 5:
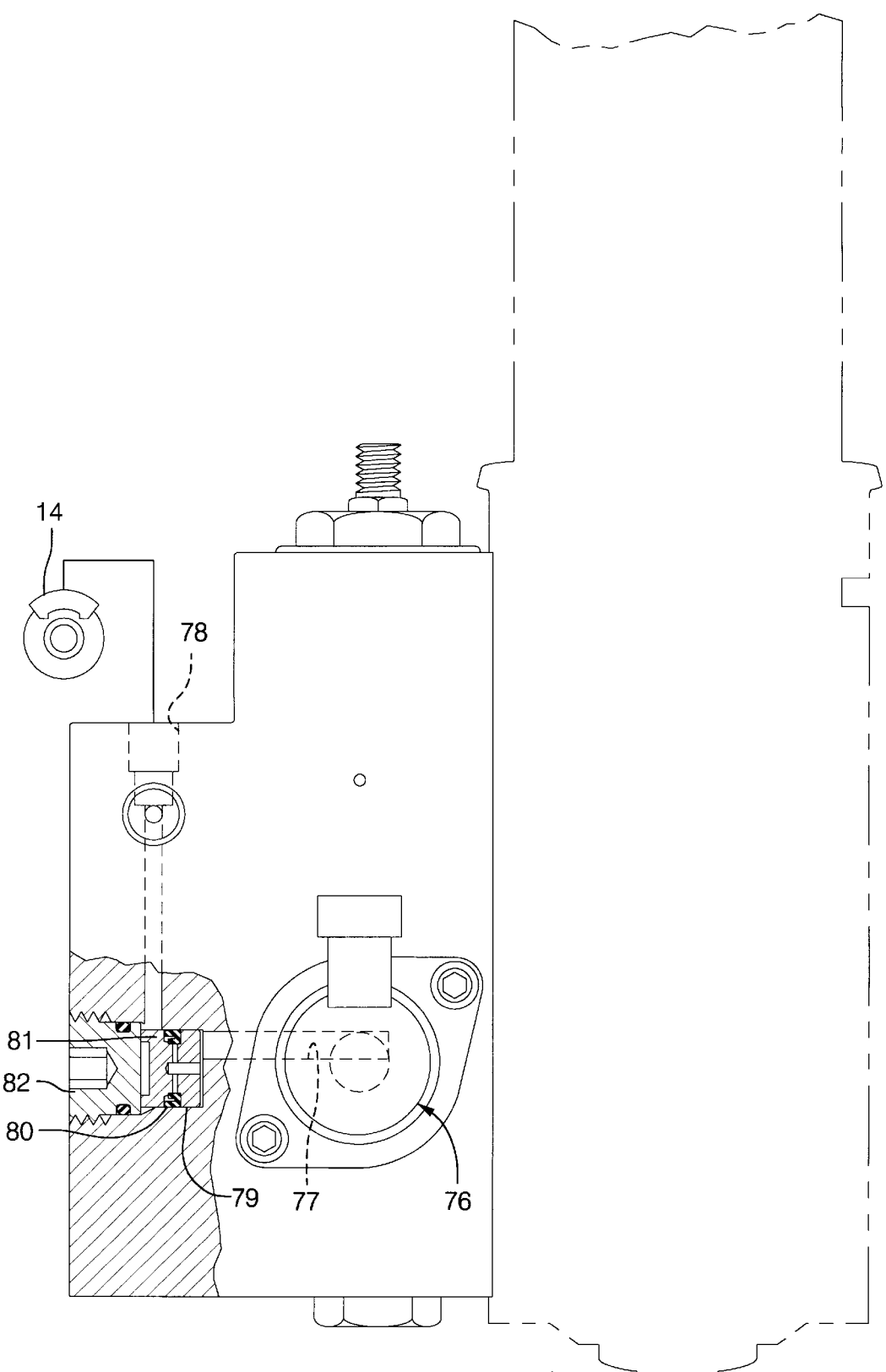
FIG. 5 is a fragmentary cross sectional detail illustration of the damper and pressure charging module of FIG. 4.

Referring to FIG. 5, it can be seen that the bore 77 is open to the port 78 through one-way check valve assembly 79. The port 78 is connected through a brake line to the wheel brake 14. The check valve assembly 79 includes a check valve seal 80 carried by an annular body 81 that is maintained in position by a plug 82. The annular body 81 includes a pair of bisecting bores that register with the groove carrying the check valve seal 80, allowing the transmission of fluid pressure to the inner diameter of the seal 80 and assisting in secure closure of the check valve. The solenoid valve 76 normally isolates the pressure charging module 11 from the wheel brake 14. The valve 76 is preferably open when a maximum current command is given to the braking system's actuator. After the initial pressure increase in the braking system 10, the majority of the compliance is taken-up and the solenoid valve 76 is closed allowing the conventional pressure generation mechanism to control the remainder of the brake apply action.

Accordingly, a pressure augmented brake apply system provides an increased fluid pressure delivery on command for initially taking-up compliance in a rapid manner and, by cutting-off augmentation, shifts into a main pressure generation mode for applying maximum braking pressures. The peak augmentation pressure level is tailored to the application and can be modified up to relatively high levels by changing the pumping piston areas and the load applied to the accumulator.

What is claimed is:

1. A brake apply system comprising:
    a wheel brake;
    a brake fluid reservoir;
    a braking actuator including a pressure generation mechanism hydraulically connected to the wheel brake through a first conduit and to the brake fluid reservoir and effective when activated to actuate the wheel brake with an actuator pressure;
    a pressure charging module including a bore carrying a pumping piston having a base piston surface and an augmentation piston surface and separating the bore into an input chamber adjacent the base piston surface and an output chamber adjacent the augmentation surface;
    a suspension damper hydraulically connected to the input chamber of the pressure charging module through a continuously open fluid communication circuit;
    an accumulator hydraulically connected to receive fluid flow from the output chamber of the pressure charging module and from the brake fluid reservoir, wherein the accumulator maintains brake fluid received from the brake fluid reservoir at an augmentation pressure charge generated by movement of the pumping piston as effected by operation of the damper; and
    a second conduit selectively connecting the accumulator to the wheel brake, wherein brake fluid at the augmentation pressure charge is selectively delivered to the wheel brake from the accumulator through the second conduit to augment brake fluid from the braking actuator.

2. A brake system according to claim 1 wherein the second conduit includes a normally closed solenoid valve positioned between the accumulator and the first conduit.

3. A brake apply system according to claim 2 further comprising a unidirectional flow valve in the second conduit preventing flow of brake fluid from the first conduit to the accumulator when the normally closed solenoid valve is open.

4. A brake apply system according to claim 1 wherein a supply conduit hydraulically connects the brake fluid reservoir, the output chamber of the bore and the accumulator and includes unidirectional flow control valves between the brake fluid reservoir and the output chamber and between the output chamber and the accumulator.

5. A brake apply system according to claim 4 wherein the pressure charging module further includes a return spring biasing the pumping piston to minimize the input chamber and the accumulator includes an accumulator piston defining an accumulator chamber open to the second conduit and a return spring biasing the accumulator piston to minimize the accumulator chamber.

6. A brake apply system according to claim 4 wherein the suspension damper includes a tube defining a working chamber and wherein the input chamber is hydraulically connected to the working chamber through a cylindrical container positioned around the tube and through a fitting engaged in a sleeve of the cylindrical container.

7. A brake apply system according to claim 1 wherein the second conduit is connected to the wheel brake through at least a portion of the first conduit.

8. A brake apply system operating in a braking mode and an augmented braking mode comprising:
    a brake pedal movable at variable apply rates including routine apply rates and non-routine rapid apply rates;
    a wheel brake;
    a braking actuator including a pressure generation mechanism hydraulically connected to the wheel brake and effective in actuating the wheel brake with an actuator pressure;
    a pressure charging module including a first bore carrying a pumping piston having a base piston surface and an augmentation piston surface and separating the first bore into an input chamber adjacent the base piston surface and an output chamber adjacent the augmentation piston surface, and having a second bore carrying an accumulator piston separating out an accumulator chamber in the second bore, wherein the wheel brake is hydraulically connected to the output chamber through a second fluid communication circuit;
    a suspension damper hydraulically connected to the input chamber of the pressure charging module through a first fluid communication circuit and the suspension damper having a reciprocating piston separating out a working chamber within the suspension damper, wherein the accumulator chamber is open to the second fluid communication circuit and maintains a pressure charge resulting from movement of the reciprocating piston during operation of the damper wherein the pressure charge is generated in the accumulator chamber by movement of the pumping piston in a first direction forcing fluid into the accumulator chamber, wherein the pressure charge is delivered to the wheel brake through the second fluid communication circuit and concurrently with delivery of the actuating pressure to the wheel brake in response to movement of the brake pedal at a rapid apply rate.

9. A brake apply system according to claim 8 further comprising a brake fluid reservoir providing a common brake fluid to the braking actuator and to the accumulator.

10. A brake apply system according to claim 8 further comprising a normally closed, selectively open, electrically activated valve in the second fluid communication circuit between the accumulator chamber and the wheel brake that opens in response to movement of the brake pedal at a rapid apply rate.

* * * * *